Figure 1:
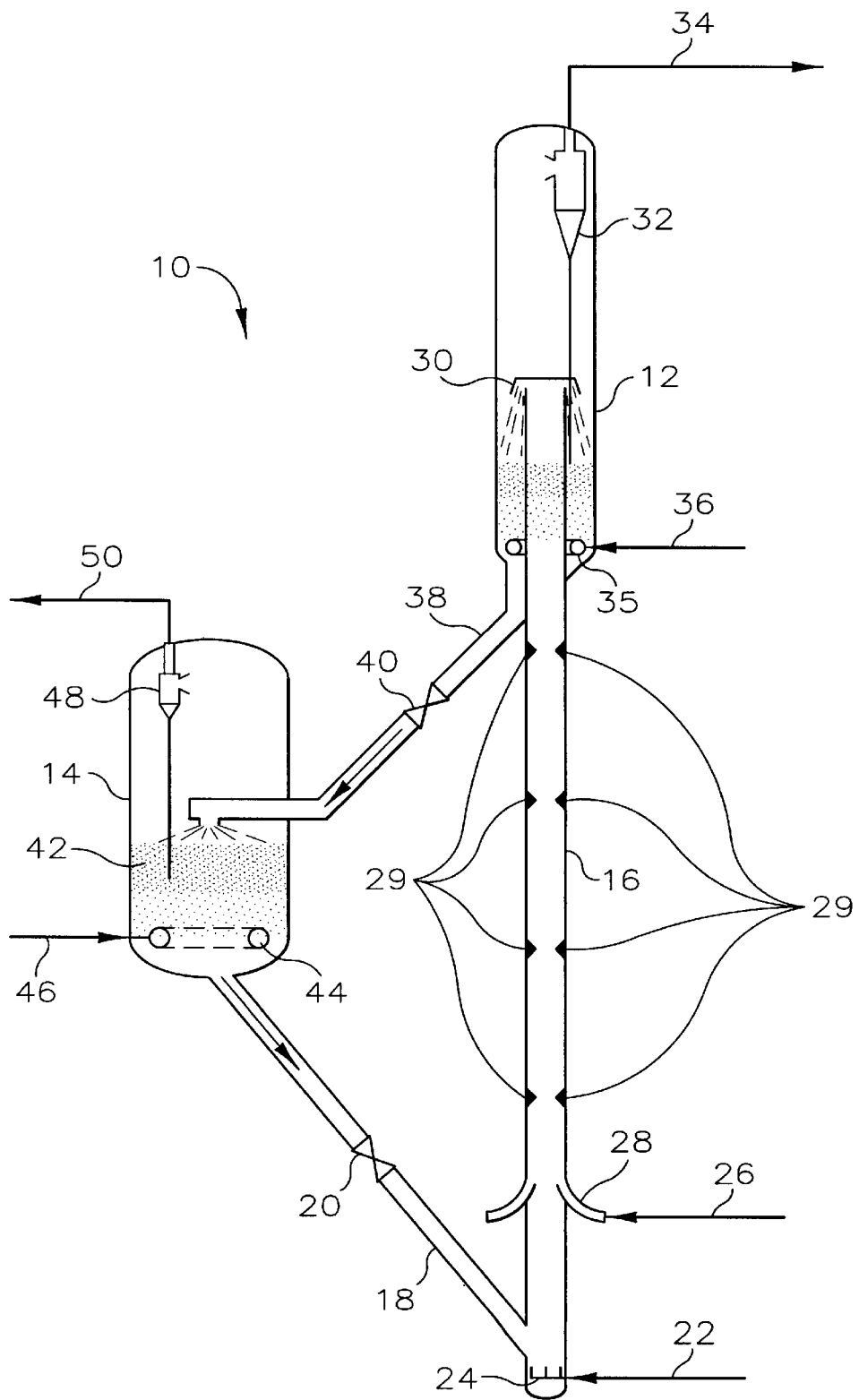

United States Patent
Wells

[19]

[11] Patent Number: 5,851,380
[45] Date of Patent: Dec. 22, 1998

[54] PROCESS AND APPARATUS FOR FLUIDIZED CATALYTIC CRACKING OF A HYDROCARBON FEED

[75] Inventor: Jan W. Wells, Bartlesville, Okla.

[73] Assignee: Phillips Petroleum Company, Bartlesville, Okla.

[21] Appl. No.: 691,065

[22] Filed: Aug. 1, 1996

[51] Int. Cl.⁶ .............................. C10G 11/18; B01J 8/18; F27B 15/08
[52] U.S. Cl. ........................ 208/158; 208/153; 208/113; 422/139; 422/145; 422/215
[58] Field of Search .................... 208/113, 153, 208/158; 422/215, 145, 139

[56] References Cited

U.S. PATENT DOCUMENTS

| | | | |
|---|---|---|---|
| 3,261,776 | 7/1966 | Baumann et al. | 208/153 |
| 3,353,925 | 11/1967 | Baumann et al. | 208/153 |
| 4,753,780 | 6/1988 | Bowen | 422/214 |
| 5,318,691 | 6/1994 | Muldowney | 208/113 |
| 5,338,438 | 8/1994 | Demoulin et al. | 208/153 |
| 5,348,644 | 9/1994 | Maroy et al. | 208/153 |
| 5,622,677 | 4/1997 | Hadjigeorge | 208/158 |

OTHER PUBLICATIONS

M. Salah et al., Effect of Internals on the Hydrodynamics of Circulating Fluidized Bed Reactors, Technical Paper presented at the Circulatory Fluidized Bed (CFB–5) Conference in Beijing, China on May 30, 1996, pp. 1–6.

*Primary Examiner*—Walter D. Griffin
*Attorney, Agent, or Firm*—Charles W. Stewart

[57] ABSTRACT

An improved apparatus and method for the fluidized catalytic cracking (FCC) of hydrocarbons. Turbulence generation means disposed on the internal surface of an FCC riser-reactor are utilized to provide for a more uniform catalyst flow pattern within the riser-reactor and to thereby provide for a better conversion and product slate.

20 Claims, 3 Drawing Sheets

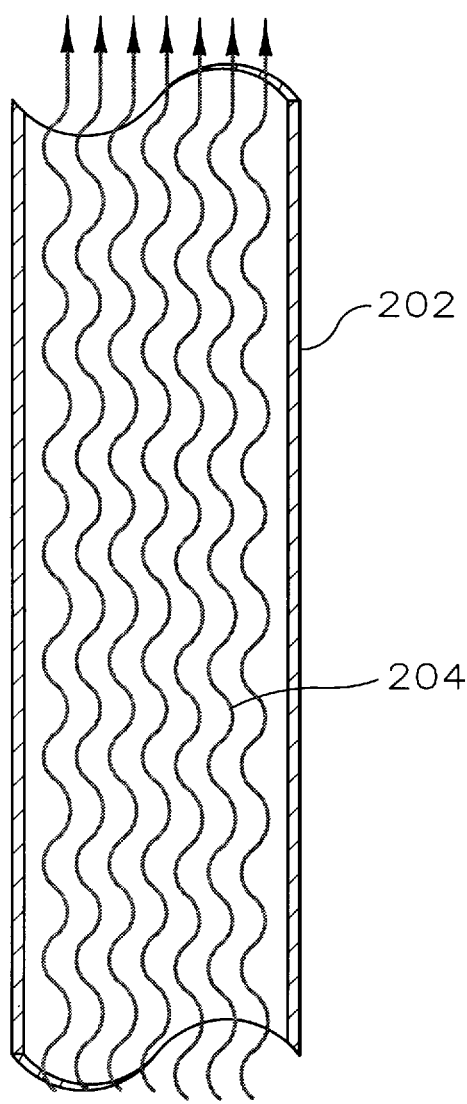
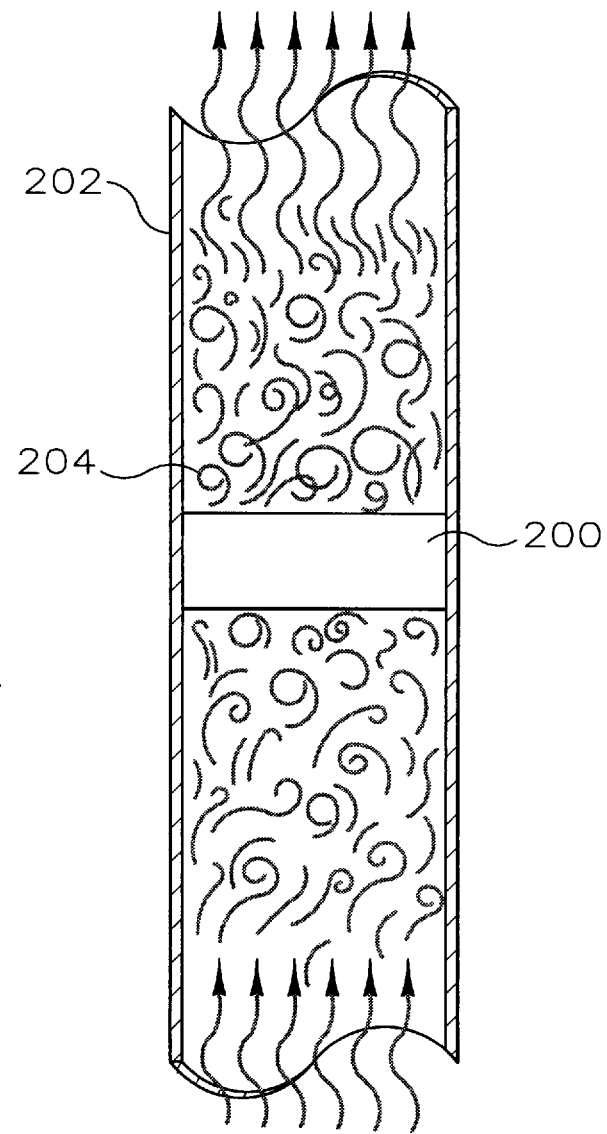
FIG. 2A          FIG. 2B
FIG. 2

PROCESS AND APPARATUS FOR FLUIDIZED CATALYTIC CRACKING OF A HYDROCARBON FEED

The invention relates to a process and an apparatus for the fluidized catalytic cracking of a hydrocarbon feedstock.

In a fluid catalytic cracking (FCC) process it has been found that the rising fluidized catalyst bed within the riser-reactor downstream from the feed injection point forms a non-homogeneous distribution of catalyst particles across the plane normal to the direction of catalyst flow. The catalyst particles have a tendency to flow in a core-annular flow pattern where they concentrate at the periphery of the riser-reactor leaving a dilute catalyst area in its center. It has been discovered that this core-annular flow pattern of catalyst can have a negative impact on the catalytic cracking performance of the FCC process and that enhanced performance can result from having a more uniform flow pattern, or a more homogeneous distribution, of catalyst in the FCC riser-reactor.

The problem of core-annular catalyst flow in a riser-reactor of an FCC process system is recognized in U.S. Pat. No. 5,338,438. The proposed solution of U.S. Pat. No. 5,338,438 to such non-homogeneous catalyst flow is the injection of pressurized gas through the riser-reactor wall into the reaction zone so as to force the catalyst accumulated against the interior riser-reactor wall toward the center of the reactor. This solution, however, poses certain problems among which include the need to provide an external gas source and the use of undesirable apertures through the riser-reactor wall in order to provide a conduit for the external gas to enter the reaction zone.

An object of the present invention is to provide a solution to the undesirable core-annular flow pattern of catalyst in the riser-reactor of an FCC process system.

Another object of the invention is to provide for a more homogeneous flow pattern of catalyst within the riser-reactor of an FCC process system without the use of gas injection through the wall of the riser reactor.

Therefore, the present invention is an improved FCC system wherein the improvement comprises a riser reactor conduit having an interior surface which defines a lift zone, a reaction zone and an injection zone located between said lift zone and said reaction zone with said interior surface of said reaction zone having disposed thereon turbulence generation means for promoting turbulence in the flow of catalyst in said riser reactor conduit.

Another embodiment of the invention is a process for contacting a hydrocarbon feedstock with hot solid particles within a riser-reactor of an FCC system first by providing an elongated conduit wherein is introduced the hot solid particles and the hydrocarbon feedstock. The elongated conduit has an interior surface and defines a lift zone, a reaction zone and an injection zone located between the lift zone and the reaction zone. The interior surface has disposed thereon turbulence generation means for promoting turbulent flow in the hydrocarbon feedstock with hot solid particles within the reaction zone. The hot solid particles are introduced with the lift zone wherein the hot solid particles are fluidized with a fluidization gas and lifted into the injection zone. Into the injection zone the hydrocarbon feedstock is introduced wherein the hot solid particles are mixed with the hydrocarbon feedstock. The mixture of hydrocarbon feedstock with hot solid particles is passed into the reaction zone.

Figure 3:
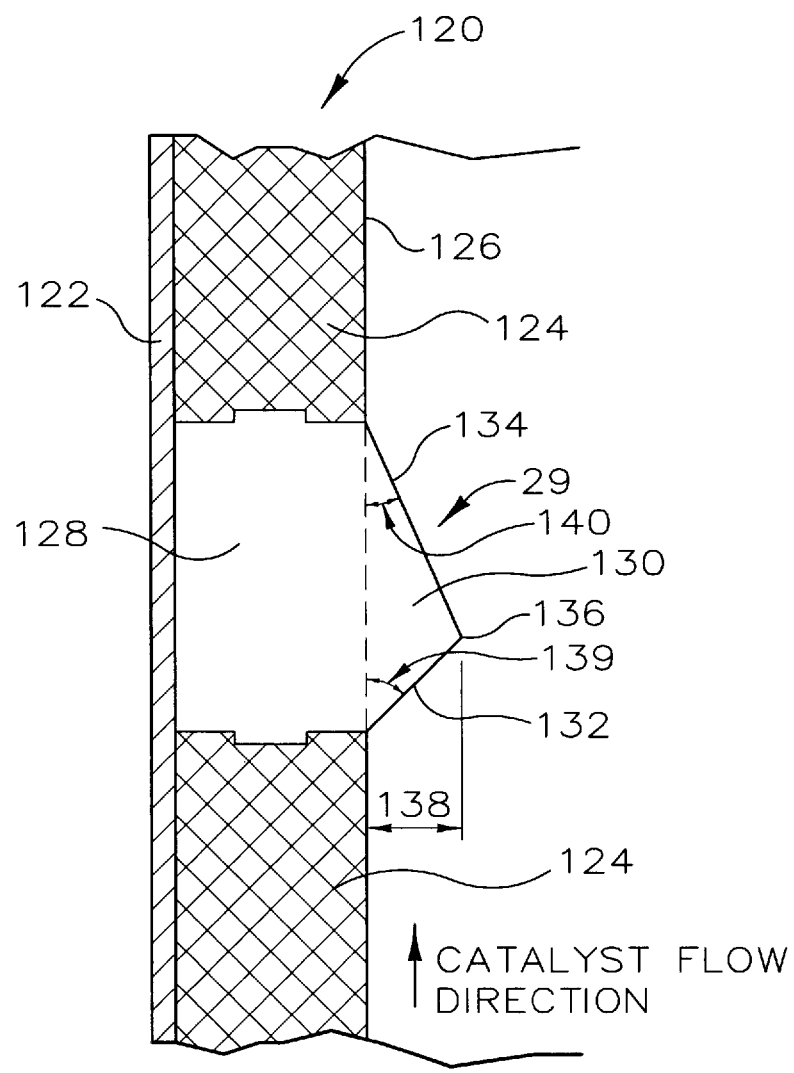

Other objects, aspects and features of the present invention will be evident from the following detailed description of the invention, the claims and the drawings in which:

FIG. 1 is a schematic representation of an FCC process system which includes the novel aspects of the invention;

FIG. 2 which presents depictions of FCC catalyst flow observed in two different experimental cold flow FCC riser-reactors. The catalyst flow depicted in FIG. 2A is for a riser without the novel turbulence generation means, and the catalyst flow depicted in FIG. 2B is for a riser provided with the novel turbulence generation means; and FIG. 3 is a cross sectional view of the wall of an FCC riser-reactor showing one embodiment of the turbulence generation means.

Now referring to FIG. 1, there is depicted an FCC process system 10, including separation system 12, regeneration system 14, and riser-reactor 16. Riser-reactor 16 is an elongated conduit having an interior surface defining a bottom lift zone, an intermediate feed injection zone and an upper reaction zone. Regenerated catalyst is introduced into the lift zone at the base of riser-reactor 16 through line 18 at a rate controlled by valve 20. The catalyst particles are then driven upward in riser-reactor 16 by injecting a gaseous fluid, or fluidization gas, into the lift zone introduced by way of line 22. The fluidization gas is dispersed into the lift zone by means of fluid distributor or diffuser 24.

A hydrocarbon feedstock is introduced into the feed injection zone of riser-reactor 16 by way of line 26. Atomizer 28 provides for the atomization of the hydrocarbon feedstock. Within the feed injection zone, the catalyst particles and hydrocarbon feedstock are mixed, and the resultant fluidized bed of catalyst particles and hydrocarbon feedstock flow upwardly through the reaction zone of riser-reactor 16. The residence time of the injected hydrocarbon feedstock within riser-reactor 16 should generally be in the range of from about 1 second to about 3 seconds. Preferably, the residence time of the hydrocarbon feedstock is in the range of from about 1.5 seconds to about 2.2 seconds, most preferably, between 1.75 seconds and 2.0 seconds. This residence time will provide a typical superficial velocity, defined as the quotient of the hydrocarbon volumetric flow rate and the riser-reactor 16 cross-sectional area, generally in the range of from about 40 feet per second to about 70 feet per second.

Disposed upon the inside surface of the reaction zone of riser-reactor 16 are turbulence generation means 29 for promoting turbulence in the flow of the catalyst particles and hydrocarbon feedstock. As the catalyst particles and hydrocarbon pass upwardly through the reaction zone of riser-reactor 16, the turbulence generating means 29 promote turbulent flow of the catalyst thereby providing for a more uniform catalyst distribution across the cross section of riser-reactor 16.

Presented in FIG. 3 is a cross sectional view of wall section 120 of riser-reactor 16 with a depiction of one embodiment of turbulence generation means 29. Wall section 120 includes metal wall 122 having attached thereto a thickness of refractory material 124. The outer surface of refractory material 124 forms the interior surface 126 of riser-reactor 16. The refractory material 124 may be any material that suitably provides for the protection of metal wall 122 from the erosive effects of flowing catalyst and for the insulation against heat transfer from the hot catalyst through wall section 120. Typical refractory material used for riser-reactor lining is known to those skilled in the art of fluidized catalytic cracking of hydrocarbons.

Turbulence generation means 29 is attached, disposed or connected to wall section 120 by any suitable means. Preferably, turbulence generation means 29 includes section 128 that is interposed within refractory material 124 and protrusion section 130 extending away from interior surface 126. Protrusion section 130 can include first surface 132, which faces an approaching catalyst flow, and second surface 134 which faces opposite an approaching catalyst flow. First surface 132 and second surface 134 respectively extend from a bottom edge and a top edge, both originating at interior surface 126, that intersect at terminal edge 136 at a distance 138 from interior surface 126.

First surface 132 slopes in the direction of the approaching catalyst flow at an angle 139 in the range of from about 30 degrees to about 60 degrees. Preferably, angle 139 is in the range of from about 35 degrees to about 55 degrees and, most preferably, from 40 degrees to 50 degrees. The slope of first surface 132 helps in preventing the formation of high velocity eddies which can cause excessive erosion.

It is also important for the slope of second surface 134 to be sufficiently gradual so as to minimize the formation of high velocity back eddies in the catalyst flow. Thus, second surface 134 slopes in the opposite direction of approaching catalyst flow at an angle 140 in the range of from about 5 degrees to 25 degrees. Preferably, angle 140 is in the range of from about 7.5 degrees to about 20 degrees and, most preferably, from 10 degrees to 15 degrees.

Distance 138 from interior surface 126 to terminal edge 136 is generally less than about 10 percent of the inside diameter of riser-reactor 16. Preferably, distance 138 is less than about 7.5 percent of the inside diameter of riser-reactor 16 and, most preferably, distance 138 is less than 5 percent of the inside diameter of riser-reactor 16.

Because of the highly erosive environment within riser-reactor 16 to which turbulence generation means 29 is exposed, it is important for it to be composed of a highly wear resistant material. The preferred material used for turbulence generation means 29 is a wear resistant, extremely hard engineered ceramic material having a high density. The engineered ceramic material should also be castable so as to facilitate the manufacture of turbulence generation means 29. Most preferably, the engineered ceramic material is a fusion casted alumina, zirconia and silica having a density of from about 210 pounds per cubic foot to about 260 pounds per cubic foot and a hardness rating exceeding about 8 on the Moh's Scale of hardness. An example of a commercially available ceramic material suitable for use in turbulence generation means 29 is Corguard™ which is a fused-cast alumina-zirconia-silica refractory sold by Corhart Refractories Corporation of Louisville, Ky.

Turbulence generation means 29 can be placed at spaced interval locations along riser-reactor 16 so as to optimize the turbulence of catalyst flow. Providing a large number of closely spaced turbulence generation means 29 can result in an excessively large pressure drop within riser-reactor 29 without providing significant incremental improvements in the turbulence of catalyst flow or in the uniformity of catalyst density. The best spacing of turbulence generation means in riser-reactor 16 is at intervals of from about 5 to about 30 inside diameters of riser-reactor 16. Preferably, the spacing of turbulence generation means in riser-reactor 16 is at intervals of from about 10 to about 25 inside diameters of riser-reactor 16 and, most preferably, the spacing can be 15 to 20 inside diameters.

Referring again to FIG. 1, riser-reactor 16 discharges at its top into separation system 12, wherein the gaseous effluents are separated from the catalyst particles by means of a ballistic separator 30 and the deactivated catalyst particles are stripped of hydrocarbon. The reaction products are further separated from catalyst particles in cyclone system 32 which is accommodated in the upper part of separation system 12 and at the top of which line 34 is provided for the discharge of the effluents from FCC process system 10. The deactivated catalyst particles drop to the bottom of separation system 12, wherein diffuser 35 supplies the fluidized bed with a stripping gas, usually steam, from line 36. The deactivated catalyst particles so stripped are discharged to regeneration system 14 through pipe 38 in which control valve 40 is provided.

The catalyst particles are regenerated in fluidized bed 42 of regeneration system 14 by combustion of the coke and of the hydrocarbons still present on their surface or in their pores through the injection of air or of oxygen by means of the diffuser 44, supplied from line 46. The catalyst particles, which have thus been brought to a high temperature by the heat of combustion, are returned to the base of riser-reactor 16 through line 18. The combustion gases pass from regeneration system 14 through cyclone separator 48 and line 50.

FIG. 2 presents pictorial representations of FCC catalyst flow that occurs in a riser-reactor having no turbulence generation means (FIG. 2A) and a riser-reactor equipped with a turbulence generation means, or so called kick-off ring 200 (FIG. 2B). Within riser wall 202 is catalyst flow 204. Arrows are used to indicate the direction of catalyst flow. As is seen in FIG. 2A, the catalyst flow within a riser-reactor not provided with turbulence generation means has a more streamlined flow pattern, or core-annular flow pattern, with the catalyst density being greater at the inside wall surface than at the center of the riser. FIG. 2B shows the catalyst flow within a riser-reactor that has been equipped with kick-off ring 200. In this riser-reactor, the catalyst flow both approaching and passing from kick-off ring 200, as well as at kick-off ring 200 itself, is turbulent. The turbulence of the catalyst flow decreases as the distance from kick-off ring 200 increases. Therefore, there is an optimum spacing for the kick-off rings in a riser reactor.

The following examples are provided to illustrate the invention.

EXAMPLE I

Samples of cracked hydrocarbon were taken from various locations across the riser-reactor of a Phillips Petroleum Company commercially operated FCC unit located at Sweeny, Tex. The samples of cracked hydrocarbon were analyzed to determine the impact, if any, of core-annular catalyst flow on cracking performance. Presented in Table I are the results of the analysis. As is shown by the data of Table 1, conversion is significantly higher at the surface of the riser wall than at the center of the riser.

TABLE 1

Results of Sampling of FCC Riser

|  | Center of Riser | Riser Wall Surface |
|---|---|---|
| Conversion, vol. % | 50.6 | 64.6 |
| Gasoline, wt. % | 35.6 | 48.7 |
| $C_4$, wt. % | 6.6 | 8.3 |
| $C_3$, wt. % | 4.4 | 4.4 |
| LCO, wt. % | 18.4 | 18.8 |
| DO, wt. % | 32.3 | 17.7 |
| $C_{2-}$, wt. % | 2.7 | 2.1 |

The differences in conversion and product slate results are believed to be due to a higher catalyst-to-oil ratio at the riser wall caused by core-annular flow pattern of the catalyst. This pattern is very significant, because it is believed that approximately 75% of the total riser flow (vaporized hydrocarbon) passes through the center 45% of the riser cross sectional area. As a result, 75% of the product vapor flow is exposed to a low catalyst-to-oil ratio and results in a less valuable product slate and more thermal cracking. Also significant is the high decant oil (DO) found at the center. This is unvaporized feed bypassing up the riser, thermally degrading to coke and coke precursors. This will contribute to the poor conversion performance.

The turbulence generator on the surface of the FCC riser promotes greater turbulence within the riser thereby providing for a more uniform catalyst distribution across the cross section of the riser. This will provide for an increase in gasoline and coke selectivity and a decrease in dry gas make because of the more uniform dispersion of the catalysts across the riser.

EXAMPLE II

Two experimental riser reactors were used to perform cold flow FCC catalyst fluidization tests. These riser-reactors were fabricated using an approximately 12 inch inside diameter tube made of clear plexiglass material. The clear material was used so that the catalyst flow within the riser could be observed and photographed. The length of the reactors were 40 feet. One of the riser-reactors was provided with two turbulence generation means, which can also be referred to as kick-off rings, spaced 10 feet apart and 15 feet from the top and bottom of the riser. The catalyst used for the test was a standard FCC zeolite catalyst and was fluidized with air at a superficial velocity in the range of from 30 ft/sec to 50 ft/sec.

FIG. 2 is a pictorial depiction of the observations made of the catalyst flow within the two experimental riser reactors. FIG. 2A represents a standard FCC riser-reactor. The catalyst was observed to have somewhat of a streamlined flow up through the riser causing a core-annular type flow pattern with the catalyst density being greatest at the reactor wall and decreasing toward the center of the riser. This core annular catalyst flow is responsible for a greater portion of a feedstock being exposed to a smaller portion of the catalyst passing through the riser. Much of the feedstock channels through the center of the riser where the catalyst density is less than that at the riser wall.

FIG. 2B represents a FCC riser-reactor equipped with kick-off rings. The catalyst flow was observed to have a more turbulent type flow pattern on both sides of the kick-off rings. This more turbulent catalyst flow provides for a more uniform catalyst density across the cross section of the riser. Because of this more uniform catalyst density profile, a feedstock is better contacted with the catalyst. The turbulence provides for a greater quantity of active cracking sites to which the feedstock may be exposed resulting in more catalytic cracking and less thermal cracking. This is desired because of the better product slate that results from catalytic cracking conditions as compared to thermal cracking conditions.

The kick-off ring design for this experiment was a ring secured to the inside wall surface of the riser having a base width facing the inside wall of 5 inches. The maximum height of the kick-off ring from the riser inside wall surface was 1 inch, which was located at a point about 1.2 inches from the bottom edge of the first surface of the kick-off ring that faced the direction of the approaching catalyst flow. The second surface of the kick-off ring faced the opposite direction of approaching catalyst flow. An embodiment of this kick-off ring is depicted in FIG. 3.

While this invention has been described in detail for purposes of illustration, it is not to be construed as limited thereby but is intended to include all reasonable variations and modification within the scope and spirit of the described invention and appended claims.

That which is claimed is:

1. An improved fluidized catalytic cracking system wherein the improvement comprises a riser reactor conduit having an interior surface defining an inside diameter, a lift zone, a reaction zone and an injection zone located between said lift zone and said reaction zone with said interior surface of said reaction zone having disposed thereon turbulence generation means for promoting turbulence in the flow of catalyst in said riser reactor conduit, wherein said turbulence generation means includes:

a first surface extending from said interior surface and facing an approaching catalyst flow; and a second surface extending from said interior surface and facing opposite said approaching catalyst flow, and wherein said first surface and said second surface intersect at a terminal edge distant from said interior surface, wherein the dimension from said interior surface to said terminal edge is less than 10 percent of said inside diameter, and wherein said first surface slopes in the direction of said approaching catalyst flow at an angle between about 30 to 60 degrees and said second surface slopes in an opposite direction of said approaching catalyst flow at an angle between about 5 to 25 degrees.

2. An improved fluidized catalytic cracking system as recited in claim 1 wherein said turbulence generation means are spaced in said reaction zone of said riser reactor conduit at intervals of from about 5 to about 30 of said inside diameter.

3. An improved fluidized catalytic cracking system as recited in claim 2 wherein said turbulence generation means further comprises an engineered ceramic material.

4. An improved fluidized catalytic cracking system as recited in claim 1 wherein said turbulence generation means is located between 2 and 3 feet above said injection zone.

5. An improved fluidized catalytic cracking system as recited in claim 1 wherein the dimension from said interior surface to said terminal edge is less than 7.5 percent of said inside diameter.

6. An improved fluidized catalytic cracking system as recited in claim 1 wherein the dimension of said interior surface to said terminal edge is less than 5 percent of said inside diameter.

7. An improved fluidized catalytic cracking system as recited in claim 1 wherein said first surface slopes in the direction of said approaching catalyst flow at an angle between about 35 to 55 degrees and said second surface slopes in an opposite direction of said approaching catalyst flow at an angle between about 7.5 to 20 degrees.

8. An improved fluidized catalytic cracking system as recited in claim 1 wherein said first surface slopes in the direction of said approaching catalyst flow at an angle between about 40 to 50 degrees and said second surface slopes in an opposite direction of said approaching catalyst flow at an angle between about 10 to 15 degrees.

9. An improved fluidized catalytic cracking system as recited in claim 1 wherein said turbulence generation means are spaced in said reaction zone of said riser reactor conduit at intervals from about 10 to about 25 of said inside diameter.

10. An improved fluidized catalytic cracking system as recited in claim 1 wherein said turbulence generation means are spaced in said reaction zone of said riser reactor conduit at intervals from about 15 to about 20 of said inside diameter.

11. A process for contacting a hydrocarbon feedstock with hot solid particles within a riser reactor of a fluidized catalytic cracking system said process comprises:

provided an elongated conduit having an interior surface, defining an inside diameter, a lift zone, a reaction zone and an injection zone located between said lift zone and said reaction zone with said interior surface of said reaction zone having disposed thereon turbulence generation means for promoting turbulence in the flow of said hydrocarbon feedstock with hot solid particles within said reaction zone, wherein said turbulence generation means includes a first surface extending from said interior surface and facing an approaching catalyst flow, and a second surface extending from said interior surface and facing opposite said approaching catalyst flow, wherein said first surface and said second surface intersect at a terminal edge distant from said interior surface, wherein the dimension from said interior surface to said terminal edge is less than 10 percent of said inside diameter, and wherein said first surface slopes in the direction of said approaching catalyst flow at an angle between about 30 to 60 degrees and said second surface slopes in an opposite direction of said approaching catalyst flow at an angle between about 5 to 25 degrees;

introducing said hot solid particles into said lift zone wherein said hot solid particles are fluidized with a fluidization gas and lifted into said injection zone;

introducing said hydrocarbon feedstock into said injection zone wherein said hot solid particles are mixed with said hydrocarbon feedstock; and passing said hydrocarbon feedstock with said hot solid particles into said reaction zone.

12. A process as recited in claim 11 wherein said turbulence generation means are spaced in said reaction zone of said riser reactor conduit at intervals of from about 5 to about 30 of said inside diameter.

13. A process as recited in claim 12 wherein said turbulence generation means further comprises an engineered ceramic material.

14. A process as recited in claim 11 wherein said turbulence generation means is located between 2 and 3 feet above said injection zone so as to prevent said hydrocarbon feedstock flow from streaming ahead of said hot solid particles.

15. A process as recited in claim 11 wherein said hydrocarbon feedstock has a residence time of 1 to 3 seconds within said elongated conduit.

16. A process as recited in claim 11 wherein said hydrocarbon feedstock has a residence time of 1.5 to 2.2 seconds within said elongated conduit.

17. A process as recited in claim 11 wherein said hydrocarbon feedstock has a residence time of 1.75 to 2.0 seconds within said elongated conduit.

18. A fluidized catalytic cracking system comprising a riser reactor conduit having an interior surface defining an inside diameter, a lift zone, a reaction zone and an injection zone located between said lift zone and said reaction zone with said interior surface of said reaction zone having disposed thereon a plurality of protrusions for promoting turbulence in the flow of catalyst in said riser reactor conduit, wherein said protrusions include:

a first surface extending from said interior surface and facing an approaching catalyst flow; and a second surface extending from said interior surface and facing opposite said approaching catalyst flow, wherein said first surface and said second surface intersect at a terminal edge distant from said interior surface, wherein the dimension from said interior surface to said terminal edge is less than 10 percent of said inside diameter, and wherein said first surface slopes in the direction of said approaching catalyst flow at an angle between about 30 to 60 degrees and said second surface slopes in an opposite direction of said approaching catalyst flow at an angle between about 5 to 25 degrees.

19. A fluidized catalytic cracking system as recited in claim 18 wherein said protrusions are spaced in said reaction zone of said riser reactor conduit at intervals of from about 5 to about 30 of said inside diameter.

20. A fluidized catalytic cracking system as recited in claim 19 wherein said protrusions further comprise an engineered ceramic material.

* * * * *